UNITED STATES PATENT OFFICE.

EDWARD BAKER, OF MILLSTONE, NEW JERSEY, ASSIGNOR TO THE NEW JERSEY ZINC COMPANY, OF NEW YORK.

IMPROVEMENT IN THE MANUFACTURE OF IRON RESEMBLING SPIEGELEISEN.

Specification forming part of Letters Patent No. 153,698, dated August 4, 1874; application filed July 16, 1874.

*To all whom it may concern:*

Be it known that I, EDWARD BAKER, of Millstone, Somerset county, and State of New Jersey, have invented an Improved Process for Producing a Quality of Iron Possessing the Characteristic Properties of Spiegeleisen; and that the following is a full, clear, and exact description thereof.

That quality of iron known as spiegeleisen has heretofore been produced in the United States from the residuum of the zinc ore of Sussex county, New Jersey, containing franklinite, after the ore has been treated for the production of white oxide of zinc, and such iron has also been produced from the residuum such as above stated, in admixture with iron ore, by a process secured to me by Letters Patent of the United States, bearing date June 10, 1873, and numbered 139,649.

I have discovered that iron possessing the essential qualities of spiegeleisen can be produced of good quality from magnetic or other iron ores, when reduced in the ordinary blast-furnace, in admixture with the slag or cinder as a flux and factor, which is obtained from the treatment, in a blast-furnace, of the residuum of zinc ore, containing franklinite and free manganese, after the ore has been treated for white oxide of zinc, or obtained from the treatment of zinc or like ore, containing franklinite and free manganese, in combination with iron ore; or, as the equivalent for such slag, manganesian limestone.

The analysis of such slag contains, on the average, the following, viz:

| | |
|---|---:|
| Oxide of manganese | 16.00 |
| Lime | 33.09 |
| Magnesia | 7.25 |
| Silica, (insoluble) | 33.25 |
| Oxide of iron, alum, and phosphorus | 10.40 |
| | 99.99 |

The iron ore and slag, such as above described, I prefer to use in about equal proportion, by weight, of iron ore and of slag, and these are mixed and treated in the ordinary blast-furnace, as in the well-known process of reducing iron ore.

In the proportions above stated I have produced good results, the iron produced containing, on analysis, the following, viz:

| | |
|---|---:|
| Metallic iron | 84.23 |
| Manganese | 10.02 |
| Carbon | 2.55 |
| Phosphorus | .22 |
| Sulphur, (a trace) | .00 |
| Silicon | 1.79 |
| Chromium | .16 |
| | 98.97 |

And although I have above given the proportions in which I have worked my improved process, and the analysis of the product so obtained, I do not wish to be understood as limiting my claim of invention to the working of the said process in the proportions named, or to a product yielding, on analysis, the precise proportions stated, as these may be varied without departing from my invention.

What I claim as my invention, and desire to secure by Letters Patent, is—

The process, substantially as described, for producing iron possessing the essential qualities of spiegeleisen, by reducing, in the ordinary blast-furnace, magnetic or other iron ores, in admixture with the slag or cinder obtained from the treatment, in a blast-furnace, of the residuum of zinc ore containing franklinite and free manganese, or from the treatment of zinc or like ore containing franklinite and free manganese, in admixture with iron ore or the equivalent of such slag, substantially as described.

EDW. BAKER.

In presence of—
WM. SCOTT,
BERNH. T. VETTERLEIN,